US007059203B2

(12) United States Patent
Asai et al.

(10) Patent No.: US 7,059,203 B2
(45) Date of Patent: Jun. 13, 2006

(54) PHYSICAL SENSOR

(75) Inventors: Mitsuru Asai, Aichi-gun (JP); Hiroaki Makino, Owariasahi (JP); Takahiko Homma, Owariasahi (JP); Kazumasa Takatori, Nagoya (JP); Jun Sugiyama, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 10/988,642

(22) Filed: Nov. 16, 2004

(65) Prior Publication Data

US 2005/0103124 A1 May 19, 2005

(30) Foreign Application Priority Data

Nov. 19, 2003 (JP) .............................. 2003-389480
Aug. 24, 2004 (JP) .............................. 2004-243860

(51) Int. Cl.
*G01D 7/00* (2006.01)

(52) U.S. Cl. .................................................. 73/862.046

(58) Field of Classification Search ................................ 73/862.041–862.045, 862.046
See application file for complete search history.

(56) References Cited

U.S. PATENT DOCUMENTS

| | | | | |
|---|---|---|---|---|
| 4,492,949 | A * | 1/1985 | Peterson et al. | 73/862.046 |
| 4,763,534 | A * | 8/1988 | Hager | 73/862.68 |
| 4,970,122 | A * | 11/1990 | Palanisamy | 428/432 |
| 5,010,772 | A * | 4/1991 | Bourland et al. | 73/862.046 |
| 5,705,981 | A * | 1/1998 | Goldman | 340/541 |
| 5,945,780 | A * | 8/1999 | Ingle et al. | 313/495 |
| 6,534,430 | B1 | 3/2003 | Makino et al. | |
| 2004/0055396 | A1* | 3/2004 | Morimoto | 73/862.045 |

FOREIGN PATENT DOCUMENTS

| | | |
|---|---|---|
| JP | 8-304200 | 11/1996 |
| JP | 10-253313 | 9/1998 |

* cited by examiner

*Primary Examiner*—Max Noori
(74) *Attorney, Agent, or Firm*—Oblon, Spivak, McClelland, Maier & Neustadt, P.C.

(57) ABSTRACT

A physical sensor having a pressure sensing layer having such property that electrical resistance is changed by application of a stress, and electrical insulating layers which are integrally formed on opposite two surfaces of the pressure sensing layer, respectively, wherein the pressure sensing layer has a matrix comprising glass, and an electrically conductive particle having electrical conductivity and dispersed in the matrix and preferably, the electrically conductive particle includes $RuO_2$, and a thickness of the pressure sensing layer is 1 μm to 200 μm, and it is preferable that one pair of electrodes are disposed on the pressure sensing layer.

11 Claims, 6 Drawing Sheets

F
1
3
4
4
2
3
10
2

PHYSICAL SENSOR

CROSS-REFERENCES TO RELATED APPLICATIONS

The present application claims priority under 35 U.S.C. §119 to Japanese Patent Application No. 2003-389480, filed Nov. 19, 2003, entitled "PHYSICAL SENSOR" and Japanese Patent Application No. 2004-243860, filed Aug. 24, 2004, entitled "PHYSICAL SENSOR". The contents of this application are incorporated herein by reference in their entirety.

BACKGROUND OF THE INVENTION

1. Field of the Invention

The present invention relates to a physical sensor for measuring a force, a pressure, a torque, a velocity, acceleration, a position, a displacement, an impact force, a weight, a vacuum degree, a rotation force, a vibration, and the like.

2. Discussion of the Background

Previously, as a means for measuring a force, a pressure, a torque, a velocity, acceleration, a position, a displacement, an impact force, a weight, a vacuum degree, a rotation force, a vibration, and the like, a physical sensor for measuring a dynamic change via a strain (stress) has been widely utilized. As this physical sensor, generally, an device constructed by utilizing a piezoresistive material has been used.

Piezoresistance refers to phenomenon in which an electrical resistance of a material is changed when a compression stress, a tensile stress, a shearing stress, or a hydrostatic pressure, etc. is applied to a material.

A physical sensor is obtained by baking a piezoresistive paste onto a diaphragm or beam comprising a metal, zirconia, and the like. In such the physical sensor, a physical parameter is measured by adding strain to a diaphragm or beam from the outside, and detecting a variation of this electric resistance.

SUMMARY OF THE INVENTION

An object of the present invention is to provide a physical sensor which can measure a physical parameter at a high sensitivity and a high precision.

One aspect of the present invention is a physical sensor comprising: a pressure sensing layer whose electrical resistivity is changed by applying a stress; and electrical insulating layers which are integrally formed on opposite two surfaces of the pressure sensing layer, respectively, wherein the pressure sensing layer comprises a matrix comprising glass, and an electrically conductive particle having electrical conductivity and dispersed in the matrix.

In the physical sensor of the present invention, the insulating layers are formed on two opposite surfaces of the pressure sensing layer so as to hold the pressure sensing layer therebetween. For this reason, the pressure sensing layer can directly receive a stress applied to the insulating layer from the outside. Therefore, a state of application of a stress to the pressure sensing layer can be averaged, and a precise stress can be measured. In addition, even when the previous device is applied to measurement of a great stress, the stress can be measured precisely.

Therefore, in the physical sensor of the present invention, its sensitivity can be improved considerably as compared with the previous device using a diaphragm or beam.

In addition, the pressure sensing layer comprises a matrix comprising a glass, in which an electrically conductive particle having electrical conductivity is dispersed. Such the pressure sensing layer has a greater resistance change rate to a stress as compared with the case where the previous piezoresistive material is utilized. That is, in the pressure sensing layer, when a stress is applied to the pressure sensing layer, its electrical resistance is changed at a better sensitivity. For this reason, in the physical sensor, by detecting this change in an electrical resistivity, a stress transferred to the pressure sensing layer from the insulating layer can be measured at a better sensitivity.

The reason why an electrical resistance is changed at a better sensitivity in the pressure sensing layer like the above can be considered, for example, as follows:

That is, in the present invention, the pressure sensing layer comprises a matrix comprising a glass, in which the electrically conductive particle is dispersed. And, it is considered that a tunnel current is easily generated in the pressure sensing layer having such the composition. Therefore, it is presumed that, in the physical sensor, a tunnel effect occurs when a stress is applied to the pressure sensing layer. Since the pressure sensing layer can utilize a tunnel effect, it is presumed that its electric resistance can be changed at a better sensitivity depending on a magnitude of a stress applied to the pressure sensing layer.

In addition, the pressure sensing layer has a glass as a matrix. And, a glass has a small Young's modulus which is around ⅓ as compared with that of a metal or zirconia which has been previously used as a diaphragm or beam. For this reason, the pressure sensing layer can precisely reflect a stress applied to the insulating layer to the whole pressure sensing layer.

In addition, since the physical sensor of the present invention has the pressure sensing layer comprising a matrix of a glass in which an electrically conductive particle having electrical conductivity is dispersed as described above, it hardly receives influence by a temperature. Therefore, the physical sensor can precisely measure a stress even under a high temperature or a low temperature environment as under a normal temperature environment.

In addition, in the present invention, the insulating layers are formed integrally with the pressure sensing layer so as to hold the pressure sensing layer therebetween. For this reason, in the physical sensor, insulating property to the pressure sensing layer can be assuredly maintained.

As described above, according to the present invention, there can be provided a physical sensor which can measure a stress at a high sensitivity and a high precision.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

Figure 1A:
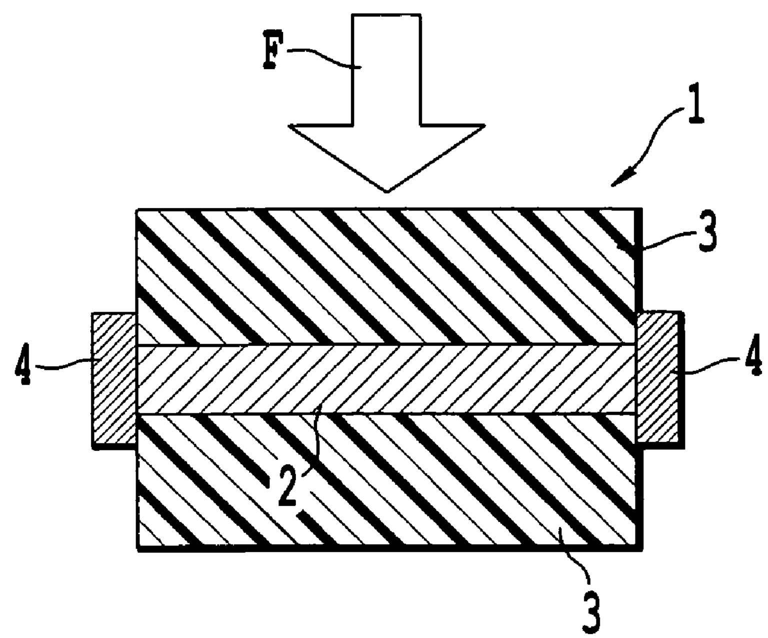
FIG. 1A is an illustration view showing composition of the physical sensor of Embodiment 1.

In the physical sensor of the present invention, it is preferable that the electrically conductive particle is dispersed almost uniformly in the matrix comprising a glass. When there is a great variance in dispersion of an electrically conductive particle, there arises a variation in a change of an electrical resistance in the pressure sensing layer, and there is a possibility that precision of the physical sensor is reduced.

As the glass, for example, a lead borosilicate glass can be used.

In addition, as the electrically conductive particle, a particle comprising, for example, ruthenium oxide ($RuO_2$) or lead ruthenate can be used. These may be used alone, or may be used in combination of two or more.

It is preferable that the electrically conductive particle comprises $RuO_2$. In this case, a sensitivity of the physical sensor can be further improved.

In addition, in the pressure sensing layer, it is preferable that the electrically conductive particle is dispersed at a ratio of 10 to 50 parts by weight relative to 100 parts by weight of the matrix.

When the electrically conductive particle is less than 10 parts by weight, contact between particles is decreased, and a resistance value of the pressure sensing layer becomes very large, and there is a possibility that a sensitivity of the physical sensor is reduced. On the other hand, when the electrically conductive particle exceeds 50 parts by weight, many of the electrically conductive parts dispersed in the matrix are contacted with each other and, as a result, a resistance of the pressure sensing layer becomes very small, and there is a possibility that a resistance change rate to an applied load becomes small. For this reason, there is a possibility that it becomes difficult to precisely measure a stress in the physical sensor.

In addition, as the insulating layer, for example, an insulating layer comprising $ZrO_2$ (zirconia), $Al_2O_3$ (alumina), $MgAl_2O_4$, $SiO_2$, $3Al_2O_3.2SiO_2$, $Y_2O_3$, $CeO_2$, $La_2O_3$ or $Si_3N_4$ can be used, and a metal whose surface is covered with each of them and is in an electrically insulated state may be also used.

In addition, in the physical sensor, the pressure sensing layer can be prepared utilizing respective processes such as doctor blade, extrusion molding, and printing (screen printing, transcription etc.).

More particularly, the pressure sensing layer can be prepared, for example, by adding an appropriate organic binder or solvent to a composite material in which a $RuO_2$ particle and, if necessary, an expanding agent or a reinforcing material are dispersed in a matrix comprising a glass mainly, obtaining a paste, and molding and sintering this. As the organic binder, for example, a cellulose-based resin or an acrylic-based resin can be used. As the solvent, for example, terpineol or butylcarbitol acetate can be used.

In addition, the organic binder or solvent can produce a pore described below in the pressure sensing layer when it is dried and burned out by heating. That is, the organic binder or solvent can play a roll as a pore forming agent. As the expanding agent, an organic expanding agent such as azodicarbonamide, or an inorganic expanding agent can be added.

In addition, the insulating layer can be prepared by utilizing respective processes such as doctor blade, and extrusion molding.

The pressure sensing layer and the insulating layer may be prepared by the same process, or different processes.

In addition, the pressure sensing layer and the insulating layers are integrally formed, and it is preferable that they are integrated by sintering.

An device in which a pressure sensing layer and insulating layers are integrally sintered can decrease the cost for manufacturing an device since a step of separately processing an insulating layer, and a step of adhering a pressure sensing layer and insulating layers can be omitted. In addition, a strength of the physical sensor can be improved.

Alternatively, the pressure sensing layer and the insulating layers may be connected with an adhesive.

Thereby, even when the pressure sensing layer and the insulating layer cannot be integrated well by sintering, integration of both of them can be easily realized.

As the adhesive, for example, an organic or inorganic adhesive, or an adhesive comprising a low melting point glass can be used.

In addition, it is preferable that a thickness of the pressure sensing layer is 1 μm to 200 μm.

When a thickness of a pressure sensing layer is less than 1 μm, a resistance value of the pressure sensing layer becomes very large, and there is a possibility that a resistance change to the stress is decreased. On the other hand, when the thickness exceeds 200 μm, a resistance of the pressure sensing layer becomes very small and, also in this case, there is a possibility that a resistance change to a stress of the pressure sensing layer becomes small.

In addition, it is preferable that a pair of electrodes is disposed on the pressure sensing layer.

Such a physical sensor can precisely measure resistance change and can improve reliability of a connection between a pressure sensing layer and a signal line.

In addition, it is preferable that a generally spherical pore is formed in the pressure sensing layer.

In such the case, since an apparent Young's modulus of the pressure sensing layer is decreased, a strain quantity due to application of a stress is increased, and a sensitivity of the physical sensor can be further improved.

Upon preparation of the pressure sensing layer by firing as described above, the pore can be formed by the firing (heating treatment) itself. Alternatively, the pore can be formed by adding an organic or inorganic expanding agent to a raw material for the pressure sensing layer, and expanding this at sintering.

In addition, upon preparation of the pressure sensing layer by sintering, a glass contained in a raw material for the pressure sensing layer is melted at rise in a temperature by heating, to form a matrix comprising a glass. A shape of the pore easily becomes a general sphere in this melted glass. It is preferable that a shape of the pore is nearer a sphere because as a shape is nearer a sphere, partial stress concentration in a pressure sensing layer can be reduced and, as a result, destruction or damage of a physical sensor can be prevented.

In addition, it is preferable that a diameter of the pore contained in the pressure sensing layer is 90% or smaller of a thickness of the pressure sensing layer, and it is preferable that a content (vol %) of the pore is 50 vol % or smaller of the pressure sensing layer.

When a diameter of the pore exceeds 90% of a thickness of the pressure sensing layer, it becomes difficult to retain a spherical shape of the pore, and stress concentration easily occurs. For this reason, in this case, there is a possibility that the physical sensor is easily destructed.

In addition, when a content of the pore exceeds 50% by volume of the pressure sensing layer, a strength of the physical sensor is reduced, and there is a possibility that the device is easily destructed.

In the pressure sensing layer, a general spherical, massy, scaly, platy or fibrous reinforcing material may be added to the matrix comprising a glass.

In this case, durability of the physical sensor to an applied stress can be further improved.

EMBODIMENTS

Embodiment 1

Then, embodiments of the present invention will be explained using FIGS. 1A and 1B to FIG. 7. In this Embodiment, a physical sensor of the present invention is prepared, and its property is assessed.

As shown in FIG. 1A, a physical sensor of this Embodiment has a pressure sensing layer 2 whose electrical property is changed by application of a stress F, and electrical insulating layers 3 which are integrally formed on two opposite surfaces of the pressure sensing layer 2, respectively. The pressure sensing layer 2 comprises a matrix essentially consisting of glass in which an electrically conducted particle comprising $RuO_2$ is dispersed.

In this Embodiment, insulating layers 3 comprise zirconia, and insulating layers 3 are formed so as to hold a pressure sensing layer 2 therebetween. And, the pressure sensing layer 2 and insulating layers 3 are integrally formed by firing. In addition, a pair of electrodes 4 are disposed on the pressure sensing layer 2.

Then, a process for preparing the physical sensor 1 of this Embodiment will be explained.

First, as an insulating layer 3, two 15 mm×15 mm×1.5 mm zirconia plates (manufactured by Tosoh Corporation) were prepared and, as a material for the pressure sensing layer 2, a resistor paste (3414A manufactured by ESL) containing a $RuO_2$ particle having a particle diameter of 0.2 to 5 μm and a glass was prepared.

This resistor paste was screen-printed on one side of a zirconia plate, and baked thereon by retaining at a temperature of 850° for 20 minutes. Similarly, the resistor paste was baked also on one side of another zirconia plate. By this baking, a binder and an organic solvent were evaporated from the resistor paste, to form a pressure sensing layer in which an electrically conductive particle comprising an electrically conductive material ($RuO_2$) is dispersed in a matrix of an electrically insulating material (glass), on a surface of a zirconia plate. A thickness of the pressure sensing layer was 20 μm.

Then, sides on which the pressure sensing layer was formed, of two zirconia plates on which the pressure sensing layer was formed on a surface as described above were overlaid and fired at a temperature of 650° C. for 40 minutes. Thereby, two zirconia plates were integrated. After firing, this was processed into a size of 5 mm×5 mm×1.5 mm, to obtain a physical sensor 1 having a sandwich structure in which the pressure sensing layer 2 is held by insulating layers 3 (zirconia plate) as shown in FIG. 1A.

Then, a silver paste (manufactured by Shoei Chemical Inc.) was prepared. This silver paste was coated on a pair of sides on which a pressure sensing layer 2 is exposed in a physical sensor 1, and heated at a temperature of 850° C. for 10 minutes. Thereby, the silver paste was baked on the pressure sensing layer 15, and a pair of electrodes 4 holding a pressure sensing layer 2 was formed.

The thus obtained physical sensor 1 was designated as sample E1.

Then, property of the thus obtained sample E1 is assessed.

Specifically, the sample E1 was investigated for a resistance change rate when a stress was applied (load property), and a resistance change rate when a temperature was changed (temperature property) as follows:

"Load Property"

Figure 2:
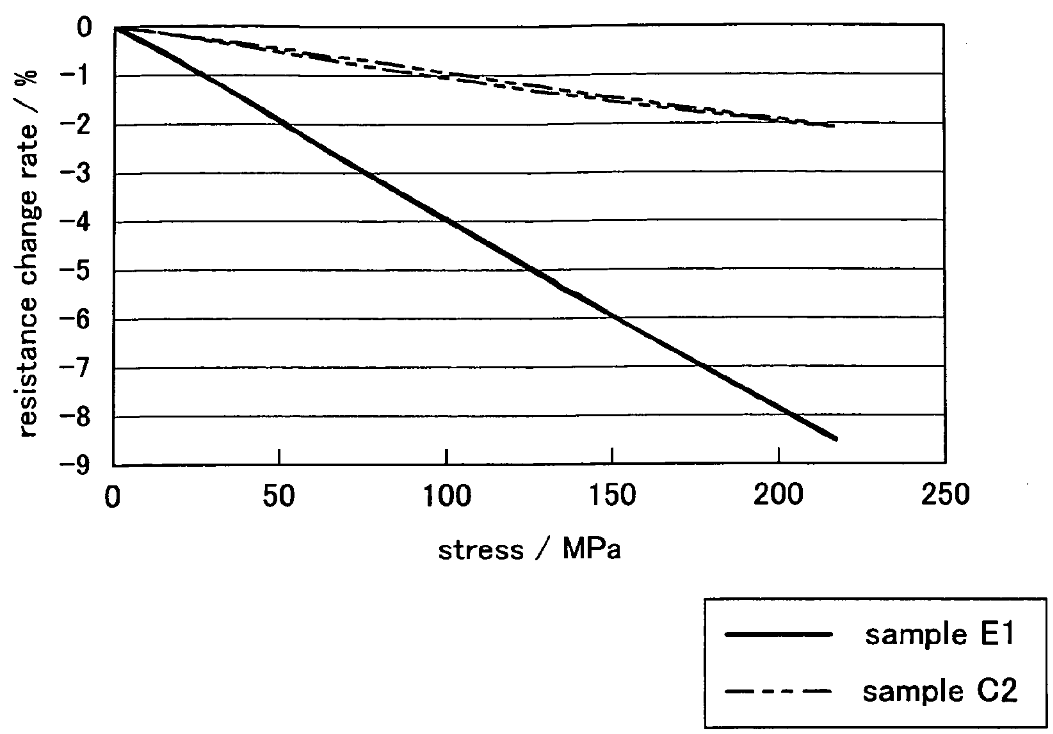
FIG. 2 is a graph showing a relationship between a stress applied to the physical sensor (sample E and sample C2) and a resistance change rate in a pressure sensing layer of Embodiment 1.

As shown in FIG. 1A, a stress F was applied to the physical sensor 1 (sample E1) in a lamination direction, and an electrical resistance of the sample E1 thereupon was measured. Upon application of a stress F to the physical sensor 1, application was performed by gradually increasing its magnitude from 0 MPa to 217 MPa and, after reaching 217 MPa, application was performed by gradually decreasing its magnitude to 0 MPa. Thereupon, a ratio of a change in an electrical resistance at stress application relative to an electrical resistance when a stress was not added (resistance change rate) was calculated, and results are shown in FIG. 2. In addition, in FIG. 2, an abscissa axis indicates an applied stress (MPa), and an ordinate axis indicates a resistance change rate (%).

"Temperature Property"

Figure 3:
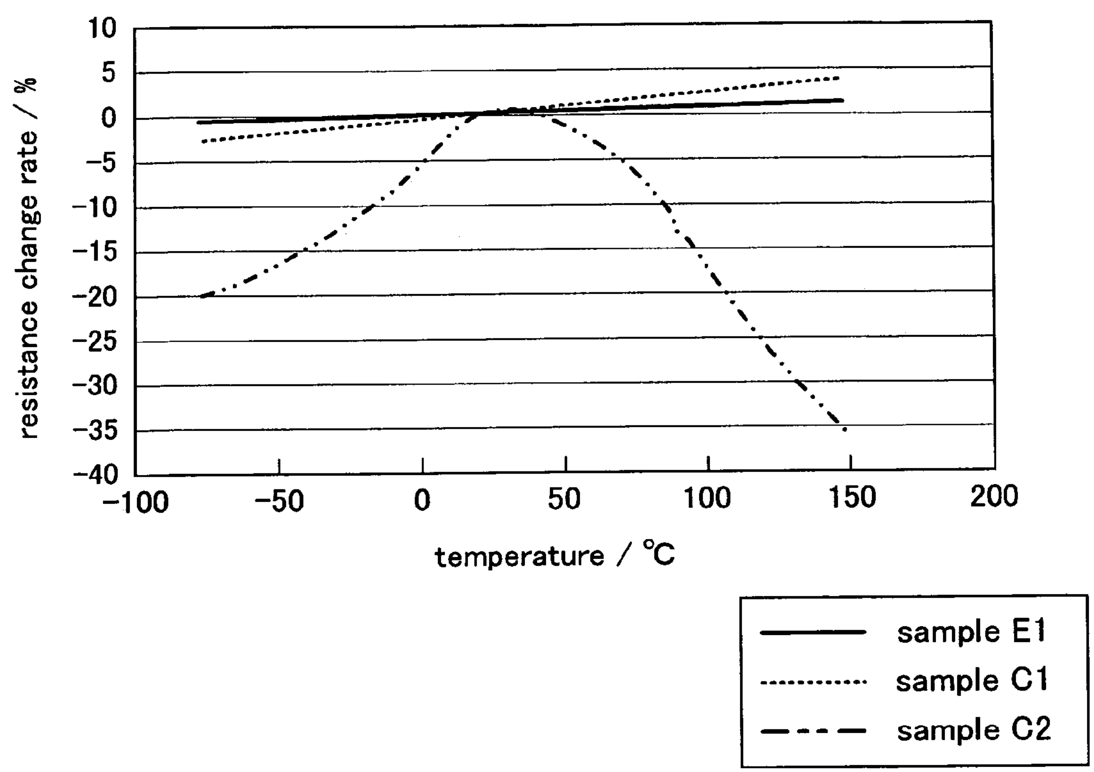
FIG. 3 is a graph showing a relationship between a temperature of the physical sensor (sample E, sample C1, sample C2) and a resistance change rate in a pressure sensing layer of Embodiment 1.

The physical sensor (sample E1) was placed into a constant temperature bath and, in this constant temperature bath, a temperature of the sample E1 was raised from 25° C. to 150° C. and, then, lowered to −80° C. During this, an electrical resistance of the sample E1 at each temperature was measured, and a ratio of a change in an electrical resistance at each temperature relative to an electrical resistance at a temperature of 25° C. (resistance change rate) was calculated. Results are shown in FIG. 3. In FIG. 3, an abscissa axis indicates a temperature (° C), and an ordinate axis indicates a resistance change rate (%) Then, in order to reveal excellent property of the physical sensor (sample E1) of Embodiment of the present invention, a sample C1 and a sample C2 were prepared as a physical sensor for comparison.

First, a physical sensor (sample C1) on which the same pressure sensing layer as that of the sample E1 was formed on a side of a rectangular parallelepiped will be explained.

Figure 4:
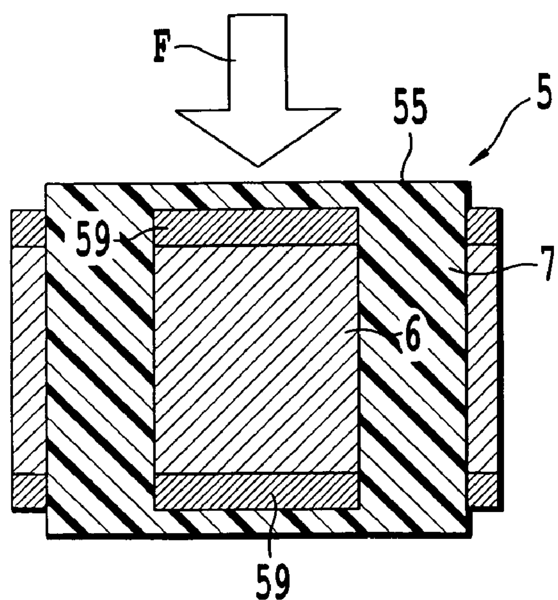
FIG. 4 is a side view showing composition of the physical sensor (sample C1) of Embodiment 1.
Figure 5:
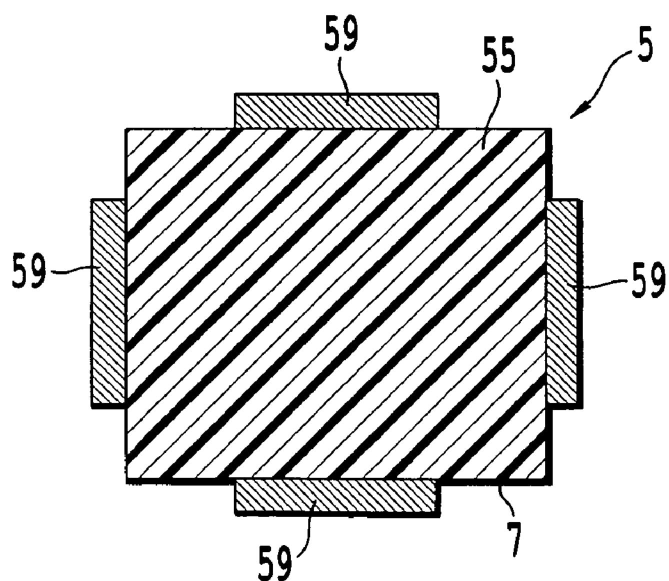
FIG. 5 is a top view showing composition of the physical sensor (sample C1) of Embodiment 1.

As shown in FIG. 4 and FIG. 5, a physical sensor 5 of the sample C1 comprises a rectangular parallelepiped 7 comprising $ZrO_2$, and a pressure sensing layer 6 in which a $RuO_2$ particle was dispersed in a glass matrix. The pressure sensing layer 6 is the same as that of the sample E1, and is formed on each of four sides of the rectangular parallelepiped 7, respectively. In addition, at an end of each pressure sensing layer 6, a pair of electrodes 59 are formed, respectively.

Then, a process for preparing a physical sensor 5 of the sample C1 will be explained.

First, as a rectangular parallelepiped 7, a ceramic comprising $ZrO_2$ was prepared. This rectangular parallelepiped 7 was prepared by processing the same zirconia plate as that used for preparing the sample E1 into a size of 4 mm×4 mm×5 mm. In addition, as a material for the pressure sensing layer 6, a resistor paste containing a $RuO_2$ particle and a glass was prepared. This resistor paste is the same as that used for preparing the sample E1.

Then, the resistor paste was printed on four sides of a rectangular parallelepiped 7 at a thickness of about 10μm, respectively, by screen printing, dried at 100° C., and baked by retaining at a temperature of 850° C. for 10 minutes in an electric furnace. Thereby, a binder and an organic solvent were evaporated from the resistor paste, and the same pressure sensing layer 6 as that of the sample E1 was formed.

Then, the same silver paste as that used for preparing the sample E1 was prepared, and this silver paste was coated on one pair of ends at a pressure sensing layer 6 formed on a rectangular parallelepiped 7, respectively. Coating of the silver paste on the pressure sensing layer 6 was performed on four pressure sensing layers 6 formed on a side of the rectangular parallelepiped 7, respectively. Subsequently, by heating at a temperature of 850° C. for 10 minutes, the silver paste was baked on the pressure sensing layer 6 to form one pair of electrodes 59 holding each pressure sensing layer 6.

The thus obtained physical sensor 5 was designated as sample C1.

Then, property of the physical sensor (sample C1) as obtained above is assessed.

Specifically, as in the case of the sample E1, a resistance change rate when a stress was applied (load property), and a resistance change rate when a temperature was changed (temperature property) were investigated as follows:

"Load Property"

As shown in FIG. 4 and FIG. 5, a stress F was vertically applied to an upper side 55 on which a pressure sensing layer 6 was not formed in the physical sensor 5 (sample C1), and an electrical resistance of the sample C1 thereupon was measured. Upon application of a stress F to the physical sensor 5 (sample C1), the stress was applied by gradually increasing its magnitude from 0 MPa to 183 MPa and, after reaching 183 MPa, the stress was applied by gradually decreasing its magnitude to 0 MPa. Thereupon, a ratio of a change in an electrical resistance at stress application relative to an electrical resistance when no stress was applied (resistance change rate) was calculated, and results are shown in FIG. 6.

In addition, as shown in FIG. 4 and FIG. 5, in the physical sensor 5 of the sample C1, the pressure sensing layer 6 was formed on four sides of the rectangular parallelepiped 7. For this reason, upon calculation of a resistance change rate, first, each of electric resistance change rates of these four pressure sensing layers 6 was calculated and, an average of these rates was obtained.

Figure 6:
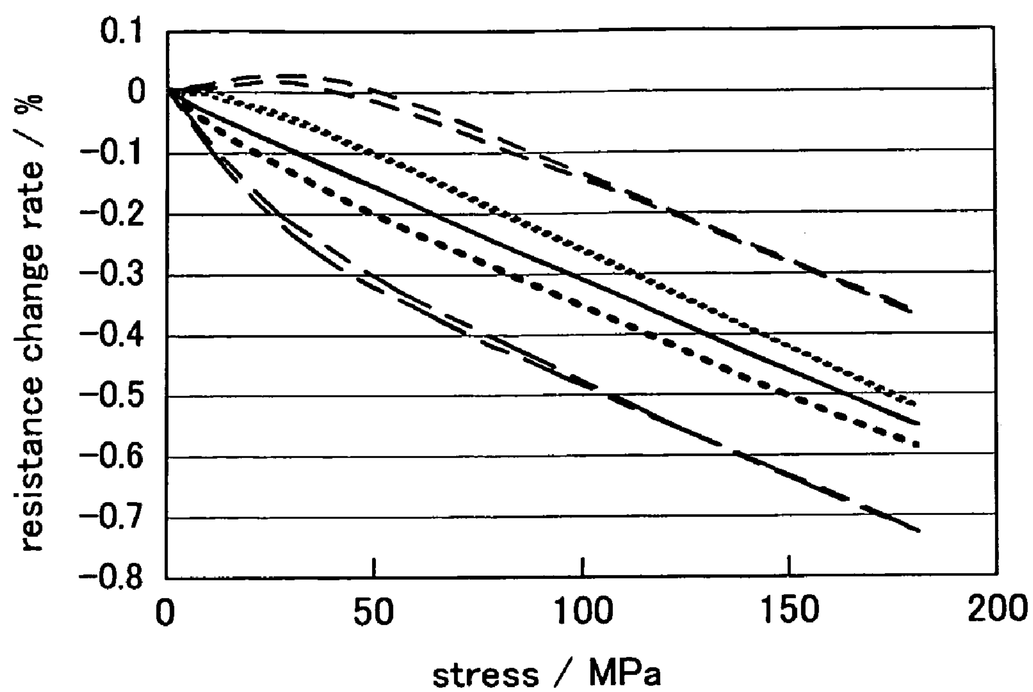
FIG. 6 is a graph showing a relationship between a stress applied to the physical sensor (sample C1) and a resistivity change rate in a pressure sensing layer of Embodiment 1.

In FIG. 6, an abscissa axis indicates a stress (MPa) applied to the sample C1, and an ordinate axis indicates a resistance change rate (%). In FIG. 6, resistance change rates of respective pressure sensing layers formed on four sides of a rectangular parallelepiped are shown by four kinds of dotted lines, respectively, and an average of them is represented by a solid line.

"Temperature Property"

The physical sensor (sample C1) was placed into a constant temperature bath and, in this constant temperature bath, as in the case of the sample E1, a temperature of the sample C1 was raised from 25° C. to 150° C. and, then, lowered to −80° C. During this, an electrical resistance of the sample C1 at each temperature was measured, and a ratio of a change in an electrical resistance at each temperature relative to an electrical resistance at a temperature of 25° C. (resistance change rate) was calculated. Results together with those of the sample E1 are shown in FIG. 3.

Then, the sample C2 for comparison will be explained.

Figure 7:
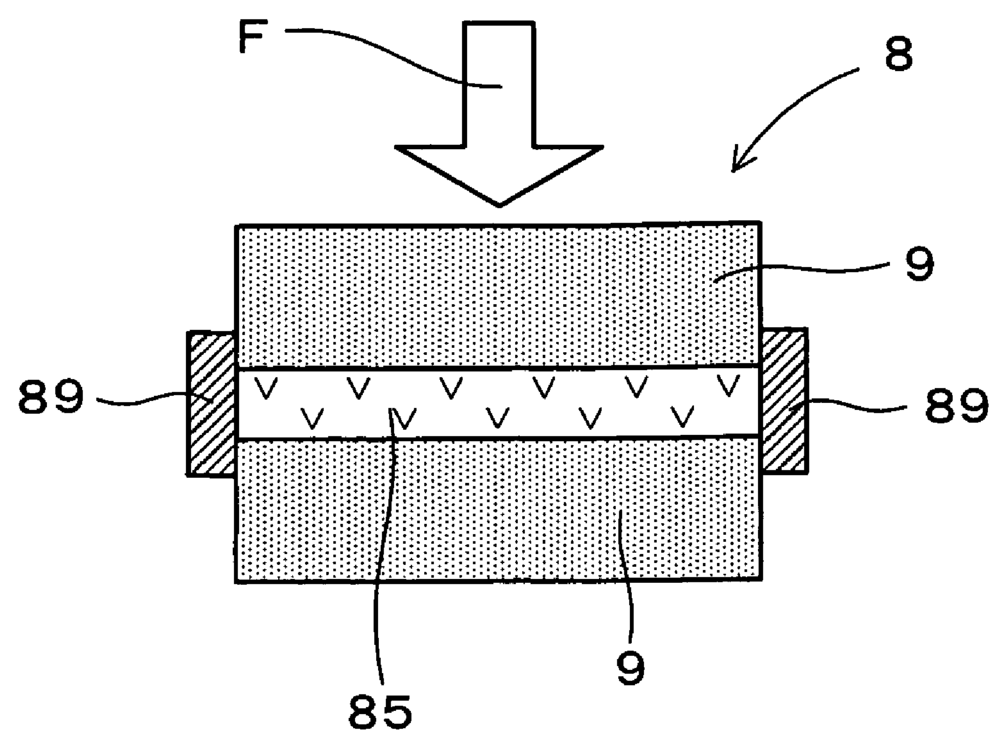
FIG. 7 is an illustration view showing composition of the physical sensor (sample C2) of Embodiment 1.

As shown in FIG. 7, the physical sensor 8 of the sample C2 has a pressure sensing layer 85 whose electric property is changed by application of a stress F, and electrical insulating layers 9 which are integrally formed on two opposite surfaces of the pressure sensing layer 85, respectively, as in the sample E1. In the sample C2, a pressure sensing layer 85 comprises a ceramic and a lanthanum-strontium manganite composite piezoresistive material. Specifically, the pressure sensing layer comprises $La_{0.75}Sr_{0.25}MnO_3$ having piezoresistivity, and $ZrO_2$ with 12 wt % $CeO_2$ added thereto as a ceramic. In addition, a pair of electrodes 89 are disposed on the pressure sensing layer 85.

In addition, the insulating layers 9 comprise 12 wt % $CeO_2$-added $ZrO_2$ ceramic.

Then, a process for preparing the physical sensor 8 of the sample C2 will be explained.

First, as a material for a pressure sensing layer 85, a material was prepared in which $La_{0.75}Sr_{0.25}MnO_3$ as a piezoresistive material and 12 wt % $CeO_2$-added $ZrO_2$ as a ceramic were dispersed and mixed. A mixing ratio of 12 wt % $CeO_2$-added $ZrO_2$ and $La_{0.75}Sr_{0.25}MnO_3$ is 7:3.

The aforementioned powders were mixed and ground with a ball mill for 4 hours and, thereafter, dried to obtain a mixed powder. This mixed powder, a resin binder, water, and a dispersant were mixed with a ball mill or a forced stirring mixer to prepare a slurry. Thereafter, a sheet for a pressure sensing layer having a thickness of 100 μnm was formed by a doctor blade method.

As a material for an insulating layer, 12 wt % $CeO_2$-added $ZrO_2$ was prepared.

As described above, 12 wt % $CeO_2$-added $ZrO_2$, a resin binder, water, and a dispersant were mixed with a ball mill or a forced stirring mixer, and a sheet for an insulating layer having a thickness of 100 μm was formed by a doctor blade method.

The sheet for the pressure sensing layer and the sheet for the insulating layer were cut into 40 mm×40 mm, and 15/one side of the sheets for the insulating layer were overlaid on both sides of two sheets for the pressure sensing layer, to obtain a laminate of a total 32 sheets. Respective sheets of this laminate was thermally pressed with a hot press.

Then, a resin binder was removed by decomposition from the fused body in a degreasing furnace. And, after CIP (cold isostatic press), the fused body was sintered in a sintering furnace under condition of 1400° C. for 4 hours. Thereby, the pressure sensing layer and the insulating layers were integrally sintered. An obtained sintered body was cut into a shape of (5 mm×5 mm×1.5 mm).

Further, a silver paste was baked on a side of the pressure sensing layer (side on which an insulating layer was not present) to form an electrode, and a physical sensor 8 (sample C2) shown in FIG. 7 was obtained.

Then, the sample C2 obtained as described above was investigated for its loading property and temperature property. The loading property and the temperature property were measured by the same method as that for the sample E1.

Results and those of the sample E1 are shown in FIG. 2 and FIG. 3.

Then, properties of the sample E1, the sample C1 and the sample C2 as a physical sensor will be explained using FIG. 2, FIG. 3 and FIG. 6.

As seen from FIG. 2, in a physical sensor of the sample E1, a resistance change rate when a stress was applied at 217 MPa was about −8.49%. To the contrary, as seen from the same figure, a resistance change rate of the sample C2 was −2.1% under the same condition as that of the sample E1. From this, it can be seen that a stress can be detected at a 4-fold or more sensitivity in the sample E1 as compared with the sample C2.

In addition, as seen from FIG. 6, in the sample C1, a resistance change rate when a stress was applied at 183 MPa (provided that the rate is an average of resistance change rates of four pressure sensing layers) was −0.55%. In results of the loading property of the sample E1 and the sample C1 (FIG. 2 and FIG. 6), when resistance change rates at application of the same magnitude of a stress, for example, a stress of 150 MPa were compared, a resistance change rate is about −6% in the sample E1, while a resistance change rate (provided that the rate is an average of resistance change rates of four pressure sensing layers) was −0.46% in the sample C1. From this, it can be seen that a stress can be detected at a 20-fold or more sensitivity in the sample E1 as compared with the sample C1.

In addition, as shown in FIG. 4 and FIG. 5, the physical sensor 5 of the sample C1 is constructed such that a stress F applied to a rectangular parallelepiped 7 is measured by applying a stress F to a rectangular parallelepiped 7, and detecting a strain of a rectangular parallelepiped 7 by a pressure sensing layer 6 formed on its side.

Thereupon, a stress F applied to a rectangular parallelepiped 7 is transferred to each side of a rectangular parallelepiped 7 with a slight variance and, as shown in FIG. 6, a variance is generated also in a stress detected on each side of a rectangular parallelepiped 7. For this reason, when a physical sensor having such the construction is used, it is necessary that a plurality of pressure sensing layers 6 are formed on each side of a rectangular parallelepiped 7 as in the sample C1, and its average is calculated.

On the other hand, as shown in FIG. 1, in a physical sensor 1 of the sample E1, a stress F applied to an insulating layer 3 is directly added to a pressure sensing layer 2. For this reason, it is not necessary to form a plurality of pressure sensing layers as in the sample C1, and a variance is not generated. For this reason, more precise measurement can be performed.

In addition, as seen from FIG. 6, in the sample C1, linearity of a resistance change rate to a stress of each pressure sensing layer formed on a side of a rectangular parallelepiped is low. In addition, there was a hysteresis between a resistance change rate when a stress was applied by gradually increasing from 0 MPa to 183 MPa, and a resistance change rate when a stress was applied by gradually decreasing a stress from 183 MPa to 0 MPa.

In the sample C1, an average of resistance change rates of respective pressure sensing layers formed on a side of a rectangular parallelepiped (represented by a solid line in FIG. 6) has relative linearity, and its non-linearity (N.L) was 2.0% F.S, and hysteresis was −0.13% F.S. "F.S" indicates full scale.

In addition, as seen from FIG. 2, also in the sample C2, linearity of a resistance change rate to a stress is very deteriorated, and its non-linearity (N.L.) was 7.22% F.S, and hysteresis was 6.5% F.S.

To the contrary, in the sample E1, as shown in FIG. 2, linearity of a resistance change rate relative to a stress was excellent, its non-linearity (N.L) was 1.4% F.S, and hysteresis was −0.01% F.S.

From the forgoing, it can be seen that the physical sensor of the sample E1 is excellent in a sensitivity to a stress as compared with the sample C1 and the sample C2, and a stress can be measured precisely.

In addition, as seen from FIG. 3, the sample E1 has very small dependency of a resistance change rate on a temperature as compared with the sample C1 and the sample C2.

That is, as seen from the same figure, the sample C1 had about 3-fold dependency of a resistance change rate on a temperature as compared with the sample E1. In addition, in the sample C2, in the state of a high temperature or in the state of a low temperature, a resistance change rate was remarkably lowered. Therefore, it is seen that a sensitivity greatly varies depending on a temperature change in the sample C1 and the sample C2.

To the contrary, in the sample E1, influence of a temperature on its resistance change rate is very small as compared with the sample C1 and the sample C2.

From the forgoing, it can be seen that the sample E1 can perform precise measurement of a stress also under different temperature environment.

As described above, it can be seen that, according to this Embodiment, there can be provided a physical sensor (sample E1) which can measure a stress at a high sensitivity and a high precision.

Embodiment 2

This Embodiment is an example in which the same physical sensor as the sample E1 was prepared by a different method from that of Embodiment 1.

That is, first, two same zirconia plates as those of the sample E1 of Embodiment 1 were prepared as an insulating layer and, at the same time, the same resistor paste as that of the sample E1 was prepared as a material for a pressure sensing layer.

This resistor paste was printed on one side of two zirconia plates at a thickness of about 10 μm, respectively, by screen printing and dried at a temperature of 100° C.

Subsequently, sides on which the resistor paste had been printed, of these two zirconia plates were overlaid, and fired at a temperature of 850° C. for 20 minutes. By this firing , a binder and an organic solvent were evaporated from the resistor paste, a pressure sensing layer was formed between two zirconia plates (insulating layers) and, at the same time, insulating layers and the pressure sensing layer were incorporated, whereby, a physical sensor having a sandwich structure was obtained in which the pressure sensing layer was held by insulating layers.

Then, the same silver paste as that of Embodiment 1 was prepared, and this was coated on one pair of sides on which the pressure sensing layer was exposed in the physical sensor, and heated at a temperature of 850° C. for 10 minutes. Thereby, the silver paste was baked on the pressure sensing layer to form one pair of electrodes holding the pressure sensing layer therebetween.

The thus obtained physical sensor was the same as the sample E1 prepared in Embodiment 1, and had small dependency on a temperature, and was able to measure a stress at a high precision like the sample E1, although not clearly shown in this Embodiment.

In the process for preparing the physical sensor of this Embodiment, a firing step can be decreased as compared with Embodiment 1. For this reason, the same physical sensor as the sample E1 can be prepared simply and at a low cost.

Embodiment 3

This Embodiment is an example in which a physical sensor was prepared by a different process from either process of Embodiment 1 or Embodiment 2.

That is, the same two zirconia plates and the same resistor paste as those of Embodiment 1 and Embodiment 2 were prepared.

Then, the resistor paste was printed on one side of one of the zirconia plates at a thickness of about 10 μm by screen printing, and dried at a temperature of 100° C. Subsequently, another zirconia plate which had not been printed was overlaid on the side of this zirconia plate on which the resistor paste had been printed, and this was fired at a temperature of 850° C. for 20 minutes. By this firing, a binder and an organic solvent were evaporated from the resistor paste, a pressure sensing layer was formed between two zirconia plates (insulating layers) and, at the same time, insulating layers and the pressure sensing layer were incorporated, whereby, a physical sensor having a sandwich structure was obtained in which the pressure sensing layer was held by insulating layers.

The thus obtained physical sensor is the same as the sample E1 of Embodiment 1 except that a thickness of the pressure sensing layer was about 10 μm has little dependency on a temperature, and was able to measure a stress at a high precision like the sample E1, although not clearly shown in this Embodiment.

In the process for preparing a physical sensor in this Embodiment, the resistor paste is printed only on one of zirconia plates, among two zirconia plates used as an insulating layer, unlike Embodiment 1 and Embodiment 2. For this reason, a physical sensor can be prepared further simpler and at a lower cost than Embodiment 1 and Embodiment 2.

Embodiment 4

This Embodiment is an example in which a physical sensor was prepared using a resistor paste to which an organic expanding agent had been uniformly added.

That is, first, the same two zirconia plates as those of the sample E1 of Embodiment 1 were prepared as an insulating layer and, at the same time, the same resistor paste as that of Embodiment 1 was prepared as a material for pressure sensing layer.

Then, 0.02 part by weight of a powder comprising a spherical azodicarbonamide particle having an average particle diameter of 6 to 7 μm was mixed into 100 parts by weight of this resistor paste, thereafter, this resistor paste was printed on one side of two zirconia plates at a thickness of about 10 μm, respectively, by screen printing, and dried at a temperature of 100° C.

Figure 1B:
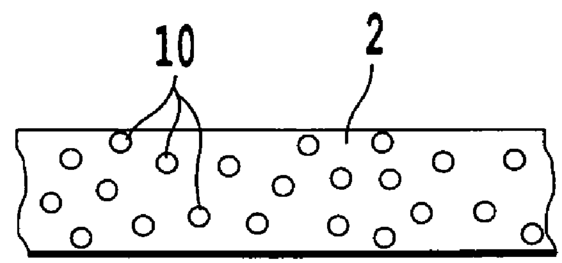
FIG. 1B is an illustration view showing the pressure sensing layer of a physical sensor containing pores.

Subsequently, sides on which the resistor paste had been printed, of these two zirconia plates were overlaid, and fired at a temperature of 850° C. for 20 minutes. During a process of rise in a temperature by heating in this firing, a binder and an organic solvent are evaporated from the resistor paste and, at the same time, an organic expanding agent is decomposed and evaporated. As a result, a pressure sensing layer having many pores in the interior is formed, as shown in FIG. 1B, between two zirconia plates (insulating layers) and, at the same time, insulating layers and the pressure sensing layer are incorporated. Thereby, a physical sensor having a sandwich structure was obtained in which the pressure sensing layer containing pores was held by insulating layers.

Then, the same silver paste as that of Embodiment 1 was prepared, and this was coated on one pair of sides on which the pressure sensing layer was exposed in the physical sensor, and heated at a temperature of 850° C. for 10 minutes as in Embodiment 1. Thereby, the silver paste was baked on the pressure sensing layer to form one pair of electrodes holding the pressure sensing layer therebetween. The thus obtained physical sensor was designated as sample E2.

The sample E2 is the same as the aforementioned sample E1 prepared in Embodiment 1 except that the pressure sensing layer was formed using the resistor paste containing an expanding agent.

This sample E2 was investigated for its loading property as in the sample E1, and a resistance change rate when a stress of 217 MPa was applied was −9.40%. That is, a resistance change rate of the sample E2 was further improved in a sensitivity by about 10.7% as compared with the sample E1. In addition, in the sample E2, linearity of a resistance change rate to a stress was excellent, its non-linearity (N.L) was 1.5% F.S, and hysteresis was −0.01% F.S.

Therefore, it can be seen that the sample E2 can measure a stress at a higher precision. In addition, although not clearly shown in this Embodiment, temperature property was investigated as in the sample E1, and the sample E2 had little dependency on a temperature like the sample E1.

In addition, after loading property and temperature property were measured, the sample E2 was cut at a central part, and its section was observed with a scanning electron microscope.

As a result, many approximately spherical pores having a size of a diameter of 8 to 16 μm were observed in the interior of the pressure sensitive material having a thickness of about 18 μm. In addition, in the pressure sensing layer in the device having a width of 5 mm, the number of pores present at an arbitrary part of a width of about 1 mm was counted, and about 30 pores were present. No defect such as crack was observed on a section or in appearance of the device.

Like this, in this Embodiment, the physical sensor (sample E2) was prepared in which spherical pores were positively introduced into the pressure sensing layer using an organic expanding agent. According to this Embodiment, it can be seen that this physical sensor is excellent in a sensitivity and also in a strength.

Although in this Embodiment, pores were positively introduced into the pressure sensing layer using the organic expanding agent as described above, spherical pores are formed in some cases by disappearance of an organic binder or a solvent contained in a resistor paste at rise in a temperature by heating (sintering), for example, also in a physical sensor prepared without using an expanding agent as in the sample E1 prepared in Embodiment 1.

Obviously, numerous modifications and variations of the present invention are possible in light of the above teachings. It is therefore to be understood that, within the scope of the appended claims, the invention may be practiced otherwise than as specifically described here.

What is claim is:

1. A physical sensor comprising:

a pressure sensing layer whose electrical resistance is changed by application of a stress; and electrical insulating layers which are integrally formed on opposite two surfaces of the pressure sensing layer, respectively, wherein the pressure sensing layer comprises a matrix comprising glass, and electrically conductive particles having electrical conductivity and dispersed in the matrix.

2. The physical sensor according to claim 1, wherein the electrically conductive particles comprise ruthenium oxide ($RuO_2$) and/or lead ruthenate.

3. The physical sensor according to claim 1, wherein a thickness of the pressure sensing layer is 1 μm to 200 μm.

4. The physical sensor according to claim 1, wherein one pair of electrodes are disposed on the pressure sensing layer.

5. The physical sensor according to claim 1, wherein generally spherical pores are formed in the pressure sensing layer.

6. The physical sensor according to claim 1, wherein the glass is a lead borosilicate glass.

7. The physical sensor according to claim 1, wherein the electrically conductive particles are dispersed at a ratio of 10 to 50 parts by weight relative to 100 parts by weight of the matrix.

8. The physical sensor according to claim 1, wherein the electrical insulating layers comprise $ZrO_2$, $Al_2O_3$, $MgAl_2O_4$, $SiO_2$, $3Al_2O_3.2SiO_2$, $Y_2O_3$, $CeO_2$, $La_2O_3$ or $Si_3N_4$.

9. The physical sensor according to claim 1, wherein said electrical insulating layers cover the surface of a metal.

10. The physical sensor according to claim 5, wherein the pores have a diameter that is 90% or smaller of the thickness of the pressure sensing layer.

11. The physical sensor according to claim 10, wherein the pores occupy a volume that is 50 volume % or smaller of the pressure sensing layer.

* * * * *